United States Patent

[11] 3,619,459

| [72] | Inventor | Paul G. Schrader<br>Antioch, Calif. |
|---|---|---|
| [21] | Appl. No. | 736,012 |
| [22] | Filed | June 11, 1968 |
| [45] | Patented | Nov. 9, 1971 |
| [73] | Assignee | The Dow Chemical Company<br>Midland, Mich. |

[54] PROCESS FOR POTTING PLASTICIZED ACETYLATED CELLULOSE HOLLOW FIBER MEMBRANES
5 Claims, No Drawings

[52] U.S. Cl............................................. 264/262,
    55/158, 210/500, 260/13, 264/331
[51] Int. Cl............................................. B29c 6/00,
    B29c 27/30
[50] Field of Search............................................. 210/22, 23,
    321, 500; 55/16, 158; 260/13; 106/176; 264/258, 262, 331

[56] References Cited
UNITED STATES PATENTS

| 2,935,488 | 5/1960 | Philips et al. ................ | 260/830 TW |
| 3,228,876 | 1/1966 | Mahon ......................... | 210/22 |
| 3,242,244 | 3/1966 | Maly ............................ | 264/83 |
| 3,442,002 | 5/1969 | Geary, Jr. et al............... | 264/311 |

OTHER REFERENCES

Hollow Fiber Membranes, Dow Chemical Co., Chemical Abstracts, 1966, Vol. 65, page 15661d, QD 1 A 51

Lee and Neville, Handbook of Epoxy Resins, N.Y., McGraw-Hill Book Co., 1967, chapter 14, page 6 TP 118 OE 6 24 C4

*Primary Examiner*—Robert F. White
*Assistant Examiner*—Gene Auville
*Attorneys*—H. L. Aamoth, Griswold and Burdick and A. R. Lindstrom

ABSTRACT: An improved method for potting plasticized, acetylated cellulose hollow fibers with a thermosettable resin is disclosed wherein an improved bond between the cured resin and the fiber results when the resin comprises a mixture of the following components: a polyglycidyl ether of a polyhydric phenol, a reactive diluent, a polycarboxylic acid anhydride, a bond promoter, a thixotropic agent and a flexibilizing agent.

3,619,459

PROCESS FOR POTTING PLASTICIZED ACETYLATED CELLULOSE HOLLOW FIBER MEMBRANES

BACKGROUND OF THE INVENTION

This invention relates to hollow fiber separatory devices wherein, generally, the terminal portions of the fibers are secured (potted) in a header tube sheet member. More particularly the invention relates to devices utilizing acetylated cellulose hollow fibers, to an improved header tube sheet and to an improved method of securing (potting) the fibers in said tube sheet.

A significant advance in the art of separation of permeable components in a fluid stream by dialysis, osmosis, reverse osmosis and the like resulted when the flat permeable membranes formerly used were replaced by permeable hollow fiber membranes. The advantages of hollow fibers are enumerated in a number of patents and other publications. Patents of interest to permeable hollow fiber separatory apparatus include U.S. Pat. Nos. 3,228,876 and 3,228,877 to Mahon; 3,228,797 to Brown et al.; 3,186,941 to Skiens; 3,339,341 to Maxwell et al. and others.

Separatory devices which utilize permeable hollow fibers may be constructed in a variety of configurations, but whatever the geometrical arrangement of the fibers they usually terminate in a header tube sheet member comprised of a thermoset resin. Devices with a single tube sheet wherein the fiber is looped with each end terminating in the same tube sheet or devices with two tube sheets are both known. Of particular importance to the operation of these devices is the bond or seal formed between the resin tube sheet and the exterior surface of the fiber. The bond must be strong enough to resist a variety of solvents or solutions, swelling and deswelling of the fiber, operational variations such as pressure and temperature, etc., without developing leaks.

A particularly useful fiber is acetylated cellulose hollow fiber but in the plasticized state the fiber is difficult to bond to the resin tube sheet because leaching of the fiber to remove the plasticizer causes the fiber to shrink which tends to pull the fiber away from the tube sheet. Certain other manufacturing needs generally require that the plasticizer be leached from the fiber after it is potted rather than before. The problem is most troublesome when sulfolane is the plasticizer.

SUMMARY OF THE INVENTION

Accordingly this invention provides for an improved method of bonding a thermoset resin header tube sheet member to plasticized, acetylated cellulosic hollow fibers secured therein. It is directed to the preparation of said tube sheet by potting the plasticized fibers in a thermosettable resin formulation comprising a polyepoxide resin, from 10 to 100 parts per 100 parts of said resin (phr.) of a reactive diluent, from 30 to 200 phr. of a polycarboxylic anhydride, from 0.5 to 5 phr. of a bond promoter, based on total formulation from 12 to 200 phr. of a long chain flexibilizing agent and from 0.5 to 5 percent by weight of total resin solids of a thixotropic agent.

DETAILED DESCRIPTION

Permeable hollow fiber separatory devices require a good bond between the resin tube sheet and the hollow fibers secured therein. This bond must be able to resist variations in temperature, pressure, the swelling or deswelling action of various solvents and/or solutions and the like. For general overall solvent resistance, inertness, ease of application, etc., polyepoxide resins are a preferred thermosetting resin.

However, when the fiber is a plasticized, acetylated cellulose hollow fiber the bonding between the fiber and any one particular polyepoxide resin formulation chosen from the multitude of possible formulations is quite unpredictable. This is especially true when the plasticizer is sulfolane, a substituted sulfolane derivative or the like. Plasticizers are necessary in order that the acetylated cellulose may be melt extruded into a hollow fiber without decomposition. Sulfolane is a preferred plasticizer and an average degree of acetylation of the cellulose of about 2.5 is preferred. After the fiber has been formed, the plasticizer can then be leached from the fiber to increase the permeability of the fiber membrane.

Additionally, the manufacture of separatory devices utilizing hollow fibers requires a resin having certain application characteristics and, in particular, characteristics which allow the resin to thoroughly penetrate a bundle of fine fibers and wet the fiber surfaces without exhibiting any pronounced wicking tendencies.

In view of this unpredictability in selecting a polyepoxide resin formulation it has been found that a good bond between the plasticized fiber and the cured resin will be formed using a polycarboxylic acid anhydride cured polyepoxide resin formulation if said formulation also contains a reactive diluent, a flexibilizing agent, a bond promoter and a thixotropic agent to minimize the wicking problems and provide the desired application characteristics.

Polyepoxide resins which have been found suitable for the resin formulations of this invention include glycidyl polyethers of polyhydric phenols. Illustrative of the polyhydric phenols are mononuclear phenols, polynuclear phenols and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2-bis(4-hydroxyphenyl)propane (bisphenol A) 4,4'-dihydroxybenzophenone, 1,1-bis(4-hydroxphenyl) ethane, bis(2-hydroxynaphthyl)methane, 2,2-bis(4-hydroxyphenyl)butane, 4,4'-dihydroxyphenyl phenyl sulfone and the like. Novolac resins include the condensation products of phenol-formaldehyde and the like.

The preparation of such resins is well known and is described in a number of patents such as U.S. Pat. No. 2,935,488 and others and in textbooks such as Lee and Neville, "Handbook of Epoxy Resins" McGraw-Hill Book Co., 1967.

The polyepoxide resin is formulated to contain from 30 to 200 phr. of a polycarboxylic acid anhydride or mixtures thereof as a curing agent, and preferably from about 10 to 150 phr. A variety of such anhydrides are well known and have been described in numerous patents such as said patent and textbook cited above and are included herein by reference. Preferably the anhydride is a lower molecular weight anhydride such as maleic anhydride. Glutaric anhydride may also serve the dual function of a curing and flexibilizing agent.

Reactive diluents useful in the present formulations are well known and include 1,4 butanediol diglycidyl ether, diglycidyl ether, phenyl glycidyl ether, butyl glycidyl ether, glycidol, epichlorohydrin and like compounds. The formulations may contain from 10 to 100 phr. of said diluents and preferably from 40 to 60 phr.

Bond promoters particularly useful with this invention are present from about 0.5 to 5 phr. and preferably from 1 to 2 phr. Bond promoters typically include tertiary amines such as N,N,N',N'-tetramethyl butane diamine, dimethylaminopropylamine, benzyl dimethyl amine, N-methyl morpholine, triethylenediamine (commercially available as Dabco) and the like.

Important to the resin formulations of this invention is the incorporation therein of from 12 to 200 phr. of a flexibilizing agent and preferably from 25 to 100 phr. Flexibilizing agents include glycidyl polyethers of polyhydric alcohols and long chain hydroxyl containing compounds. Said glycidyl polyethers may be prepared from a variety of well known polyhydric alcohols such as glycol, polyethylene glycols, polypropylene glycols, hexamethylene glycol and the like. Long chain mono- and polyhydroxyl containing compounds also provide flexibility, and include glycols such as 1,6 hexanediol, polyethylene glycol, polypropylene glycol and the like and hydroxy terminated esters and polyesters including fatty acid monoesters of glycols such as propylene glycol monoricinoleate, and the like.

When liquid polyepoxide resins are brought into contact with hollow fibers such as contemplated herein, an undesirable tendency to wick along the fiber away from the site desired is frequently exhibited. However, a liquid resin is highly desirable in order to obtain intimate contact with the resin and the surface of the fiber and to thoroughly penetrate into a bundle of fibers when a very large number of extremely small bore fibers are potted.

These requirements are best met when the potting resin is made thixotropic. For the present compositions the thixotropic character can be imparted by incorporating from 0.5 to 5 percent by weight of the total resin formulation of a colloidal silica such as that sold under the name of Cab-O-Sil. While colloidal silica is preferred, other thixotropic agents such as those sold as Bentone 34, Thixotrol ST, Ircogel 901 and the like may be used. Optionally, a coupling agent may be included in the formulation when colloidal silica is used. Typically these coupling agents are hydroxy compounds and include such compounds as glycol, glycerine, and the like.

The resin formulations of this invention may be cured by heating but they are designed to cure, generally, at ambient temperatures or slightly above. Curing can be accomplished by heating to 50° to 100° C. or even higher for short periods of time, but the curing temperature or cure time is regulated by the thermal stability of the fiber and not the resin composition.

Further illustration of the present invention is shown in the following nonlimiting examples.

EXAMPLE 1–5

A simple test used for screening resins comprised a small mold made from a ⅝inch ×1¼inch piece of polyethylene tubing having a cork inserted in one end. The mold was set upright on the cork end and a looped bundle of sulfolane plasticized acetylated cellulosic hollow fibers were inserted, loop end, into the mold cavity. The potting resin was then poured in and cured for up to 16 hours at about 50° C.

After curing, the ends of the tubing were cut to expose open fiber ends and the exposed tube sheet surface examined under a microscope. A poor resin can be detected by a visible separation between the fiber wall and the resin. If the fibers appeared to be well bonded the potting was soaked in distilled water. After 4 hours of soaking the exposed ends were examined again under the microscope. Most of the unsatisfactory formulations are detected by the 4 hour soak and practically all by a 24 hour soak.

The screening tests were usually made without the thixotropic agent in order to check the effectiveness of the bond first. Formulations which passed the screening test were then formulated with a thixotropic agent and used to manufacture actual separatory units.

A series of formulations were prepared with maleic anhydride as the curing agent, and tested as above. The formulations contained stoichiometric amounts of maleic anhydride (i.e., 1 anhydride equivalent weight per 1 epoxide equivalent weight) and the additional components shown in Table I. Resin A is a glycidyl polyether of resorcinol having an epoxide equivalent weight of 124 to 140 and available commercially as Kopox 159. Resin B is a glycidyl polyether of bisphenol A having an epoxide equivalent weight of 186–192. The formulations were cured for an additional 1–½ hours at 100° C.

TABLE I

| Ex. | Resin | Reactive diluent | Bond promoter | Flexibilizer |
|---|---|---|---|---|
| 1 | A | RD-2 50 phr | TMBDA 4 phr | Epoxide G 50 phr. |
| 2 | B | RD-2 50 phr | TMBDA 4 phr | Epoxide G 50 phr. |
| 3 | A | RD-2 50 phr | TEDA 4 phr | Epoxide G 50 phr. |
| 4 | A | RD-2 50 phr | N-MM 4 phr | PGR 33 phr. |
| 5 | A | RD-2 50 phr | N-MM 4 phr | PGR 33 phr. |

NOTE.—The following abbreviations are used:
Phr.=parts per 100 parts of resin.
RD-2=diglycidyl ether of 1,4-butanediol.
TMBDA=N,N,N',N'-tetramethylbutanediamine.
TEDA=Triethylene diamine (Dabco).
N-MM=N-methyl morpholine.
Epoxide G=diglycidyl ether of a polyglycol having an epoxide equivalent weight of 175–205.
PGR=propylene glycol mono-ricinoleate.

All of the above formulations, when cured, had excellent water resistance and bonding of the fiber to the resin after soaking. The addition of colloidal silica to the above formulations provides good thixotropic application characteristics.

Hollow fiber separatory elements can be prepared in a variety of ways and one method for preparing small laboratory test elements consisted essentially of winding a tow of hollow fibers spirally around a cylindrical core (about 6 inches long) in a plurality of layers and simultaneously applying the resin in a longitudinal strip during the winding operation. After the resin is cured the longitudinal strip may be cut or holes drilled in a staggered overlapping pattern to expose open fiber ends in a tube sheet.

The above resin formulations containing 2 percent of colloidal silica (Cab-O-Sil) were used to prepare a hollow fiber separatory element in a similar manner to that above and by drilling a pattern of holes in the longitudinal tube sheet. After leaching the sulfolane away from the fiber the resin tube sheet had an excellent bond to the fibers and the tube sheet showed excellent water resistance.

EXAMPLE 6

The resin formulation of example 2 was modified to contain butyl glycidyl ether in place of the RD-2 as a reactive resin diluent. Similar results were found in that a hard tough resin was formed with excellent water resistance and bonding of the fiber to the resin.

Similar results are also found if the maleic anhydride is replaced in equivalent amounts by phthalic anhydride, chlorendic anhydride or other well known anhydride curing agents.

EXAMPLE 7

The compatibility of the present formulation with other ingredients was shown wherein a polyhalogenated naphthalene (Arochlor) was added to the formulation to help the formulation penetrate through the fiber lubricant. The formulation contained Resin B and maleic anhydride as in example 2 and was cured similarly and also contained 50 phr. of RD-2 diluent, 33 phr. of PGR. flexibilizer, 7 phr. of tetramethyl guanidine and 17 phr. of Arochlor. Excellent properties, similar to the previous examples were found.

EXAMPLE 8

Similar results were found when the resin formulation of example 7 contained 5 phr. of N-methyl morpholine in place of the tetramethyl guanidine and when said resin was cured for about 16 hours at 50° C.

EXAMPLE 9–12

Another series of resin formulations was prepared and evaluated as in examples 1–5 with glutaric anhydride as both the curing agent and flexibilizing agent. The resins were cured for 16 hours at 50° C. and contained an equivalent amount of glutaric anhydride per epoxide equivalent.

| Example | Resin | Reactive Diluent | Bond Promoter | |
|---|---|---|---|---|
| 9 | B | RD-2 5 phr. | TMBDA | 5 phr. |
| 10 | A | RD-2 5 phr. | TMBDA | 3 phr. |
| 11 | A | RD-2 5 phr. | Pyridine | 8 phr. |
| 12 | A | RD-2 5 phr. | N-MM | 5 phr. |

All the above formulations provide good water resistance and fiber to resin bonding and may be readily formulated with colloidal silica to provide the thixotropic properties desired in the preparation of hollow fiber separatory elements.

As used, herein, the term potting refers to the process of curing a thermosettable resin having portions, usually terminal portions, of hollow fibers embedded or positioned in said resin.

The above examples are set forth for purposes of illustrating the present invention. Variations and modifications of the examples and written description will be obvious to those skilled in the art and may be made without departing from the scope of the invention as claimed.

We claim:

1. In the process of preparing a permeable hollow fiber membrane separatory apparatus wherein generally the terminal portions of said hollow fibers are secured in a header tube sheet member by potting said fiber terminal portions in a thermosettable resin, the improvement which comprises potting plasticized acetylated cellulose hollow fibers in a thermosettable resin consisting essentially of
   a. a polyepoxide resin wherein said resin is a glycidyl polyether of a polyhydric phenol or mixtures thereof;
   b. from 5 to 100 parts of a reactive diluent containing one or more glycidyl groups;
   c. from 30 to 200 parts of a polycarboxylic anhydride;
   d. from 0.5 to 8 parts of a tertiary amine bond promoter;
   e. from 12 to 200 parts of a flexibilizing agent wherein said agent may be a glycidyl polyether of a polyhydric alcohol, a long chain hydroxyl containing compound or glutaric anhydride; and
   f. a sufficient amount of a thixotropic agent within the proportions of about 0.5 to 5 percent by weight based on total weight of components a)–e) to prevent wicking of said resin along the fibers.

2. The improved process of claim 1 wherein said plasticized acetylated cellulose fibers contain sulfolane.

3. The improved process of claim 1 wherein said polyepoxide resin is a glycidyl polyether of a polynuclear polyhydric phenol or a glycidyl polyether of a mononuclear polyhydric phenol.

4. The improved process of claim 1 wherein said polycarboxylic anhydride is maleic anhydride or glutaric anhydride.

5. The improved process of claim 1 wherein said thixotropic agent is colloidal silica.

* * * * *

UNITED STATES PATENT OFFICE
CERTIFICATE OF CORRECTION

Patent No. 3,619,459   Dated 9 November 1971

Inventor(s) Paul G. Schrader

It is certified that error appears in the above-identified patent and that said Letters Patent are hereby corrected as shown below:

Column 6, line 10, add the following at the end of Claim 1:

--said parts of said components b) - e) based on 100 parts of polyepoxide resin.--

Signed and sealed this 1st day of May 1973.

(SEAL)
Attest:

EDWARD M. FLETCHER, JR.
Attesting Officer

ROBERT GOTTSCHALK
Commissioner of Patents